UNITED STATES PATENT OFFICE.

JOHN B. KING, OF BROOKLYN, NEW YORK, ASSIGNOR TO ALPHONSE FRIEDRICK, OF SAME PLACE.

DECORATIVE CUTTING OF POLISHED GLASS GLOBES, &c.

SPECIFICATION forming part of Letters Patent No. 243,579, dated June 28, 1881.

Application filed March 26, 1881. (No specimens.)

*To all whom it may concern:*

Be it known that I, JOHN B. KING, a citizen of the United States, residing at 557 Fourth avenue, Brooklyn, in the county of Kings and State of New York, have invented certain new and useful Improvements in Decorative Cutting of Polished Glass Globes and Porcelain Ware; and I do hereby declare that the following is a full, clear, and exact description of the invention, which will enable others skilled in the manufacture of glass globes, &c., to make and use the same.

Heretofore globes and hollow ware were found to break while in process of cutting by the already patented process for cutting polished glass, the description of which is annexed to my Patent No 237,112, February 1, 1881.

The object of my invention is to prevent the breaking of all hollow glass or porcelain ware while in process of cutting on the outside, and to this end the invention consists in coating the inside of the hollow ware with glue.

To carry my invention into effect I take, for instance, a glass globe, and, after submitting it to the process for cutting polished glass, I then dip the globe into a strong solution of warm glue. By this means the globe is coated inside, and when dry prevents the vessel from breaking during the process of cutting glass, as described in the original patent for cutting polished glass. The globe or hollow vessel, when completely coated with glue on the inside and rubbed with glue on the outside by means of sand-paper or ruby or emery cloth, is then submitted to the process for cutting polished glass.

Having fully described my invention, what I desire to secure, and claim by Letters Patent, is—

The preventing of glass or hollow porcelain ware from breaking by coating the inner wall of the hollow vessel with glue while being submitted to the process of cutting polished glass, substantially as described.

JOHN B. KING.

Witnesses:
ALPHONSE FRIEDRICK,
JOSEPH V. SCULLEY.